E. NORMAN.
FOLDING TELESCOPE.
APPLICATION FILED OCT. 20, 1919.
1,348,730.
Patented Aug. 3, 1920.
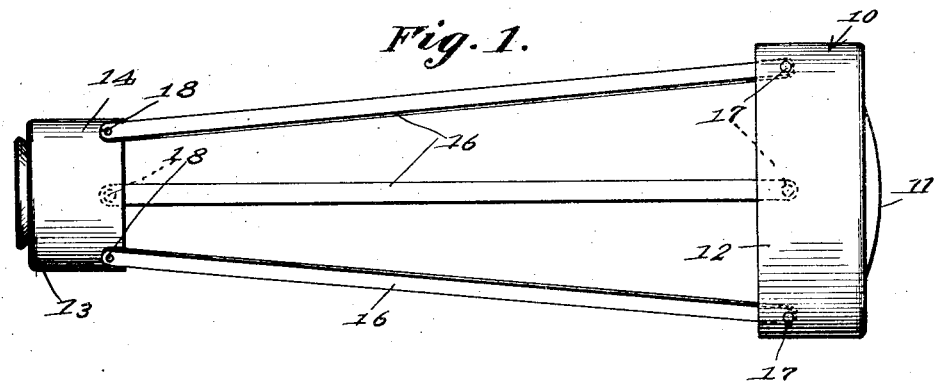
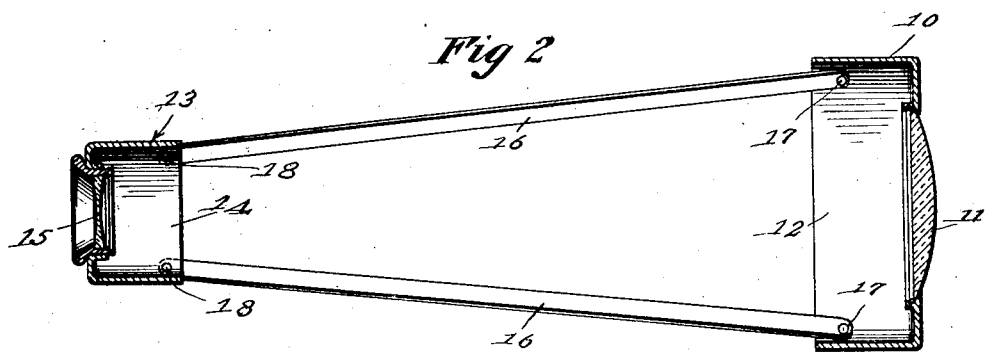
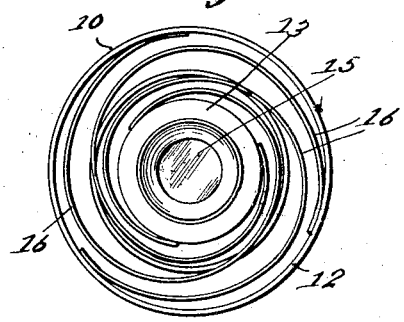
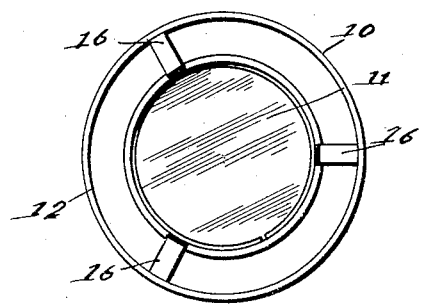
WITNESS:
R. C. Thomas
Emil Norman.
INVENTOR.
BY
Victor J. Evans
ATTORNEY.

UNITED STATES PATENT OFFICE.

EMIL NORMAN, OF HOLMQUIST, SOUTH DAKOTA.

FOLDING TELESCOPE.

1,348,730.

Specification of Letters Patent.   Patented Aug. 3, 1920.

Application filed October 20, 1919. Serial No. 331,987.

*To all whom it may concern:*

Be it known that I, EMIL NORMAN, a citizen of the United States, residing at Holmquist, in the county of Day and State of South Dakota, have invented new and useful Improvements in Folding Telescopes, of which the following is a specification.

This invention relates to telescopes, particularly to those of the folding type, and has for its object the provision of a telescope provided with novel means connecting the frame of the objective with the frame of the eye-piece whereby the eye-piece frame may, upon simple partial rotary movement thereof be caused to occupy a position entirely within the frame of the objective whereby the parts will occupy the minimum space when collapsed, so as to obtain the maximum convenience in packing and transportation.

More specifically the object of the invention resides in the provision of a telescope in which the frame of the objective is connected with the frame of the eye-piece by a plurality of strips of spring steel which are pivotally connected at their ends upon the respective frames and which by partial relative movement of the frame may be moved to assume a spiral form and be disposed entirely within the confines of the frame of the objective so that the frame of the eye-piece will also be disposed within the frame of the objective.

An important object is the provision of a telescope of this character in which the points of connection of the steel spring strip with the inner and outer peripheries of the objective and eye-piece frame, respectively, are so arranged that when the device is collapsed the tendency of the springs will be to maintain the eye-piece frame within the frame of the objective so as to prevent any accidental displacement thereof.

A further object is the provision of a telescope of this character which will be extremely simple and inexpensive in manufacture, highly efficient and durable in use and a general improvement in the art.

With the above and other objects and advantages in view, the invention consists in the details of construction to be hereinafter more fully described and claimed, and illustrated in the accompanying drawings in which:—

Figure 1 is a side elevation of a telescope constructed in accordance with my invention, the parts being in extended position.

Fig. 2 is a longitudinal sectional view therethrough.

Fig. 3 is a rear end elevation with the parts collapsed and

Fig. 4 is a detail cross sectional view.

Referring more particularly to the drawing the numeral 10 designates the frame of the objective, this frame being of cylindrical form, and having secured therein in any desired manner, the objective lens 11. This frame 10 includes the flange 12. The numeral 13 designates the frame of the eye-piece from which extends the cylindrical flange 14 and within which is secured the usual lens 15, in any desired manner. The frames 10 and 13 are identical in shape and construction, the only difference being that the frame 13 is of much more diameter than the frame 10.

The connection between the frames 10 and 13 consists of a plurality of strips 16, preferably though not necessarily three in number pivotally connected at one end, as shown at 17 upon the inner periphery of the flange 12 and pivotally connected at the other, as shown at 18 upon the outer periphery of the flange 14.

When the device is in use, the parts are disposed as shown in Fig. 1 of the drawing and the eye-piece frame 10 is held in proper spaced relation to the frame 13 by the strips 16 which in this position extend longitudinally of the device as shown.

When it is desired to collapse the device it is merely necessary that the operator grasp the casing 13 and partially rotate the same, at the same time exerting slight pressure toward the frame 10. The resultant twisting of the strips 16 will cause them to assume a spiral form which becomes more and more pronounced as the frame 13 approaches the frame 10. As this movement is continued the frame 13 will be disposed entirely within the confines of the frame 10 with the strips 16 arranged spirally in the space between the flanges 14 and 12. In view of the fact that the pivot points 17 are disposed a greater distance from the front wall of the frame 10 than the distance between the pivot points 18 and the free edge of the flange 14, the tendency of the spring strip 16, when the device is collapsed will be to hold the free edge of the flange 14 against the front wall of the frame 10, this tendency preventing any accidental springing out of the frame 13. When it is desired to extend the device for use, it is merely necessary that the operator grasp the frame 13 and pull it away from the frame 10 whereupon the strips 16 will spring out of the frame 10 and be again disposed in longitudinally extending position.

Having thus described my invention I claim:—

1. A folding telescope comprising a cylindrical objective frame, a lens therein, a cylindrical flange on said frame, a cylindrical eye-piece frame of less diameter than said first named frame, a lens therein, a cylindrical flange on said second named frame, and a plurality of spring strips pivoted at one end upon the inner periphery of said first named flange and pivoted at their other end upon the outer periphery of said second named flange, said strips normally holding said flanges in spaced relation, partial relative rotation of said frames resulting in twisting of said strips into spiral form, with said second named frame disposed within said spiral and within said first named frame.

2. A folding telescope comprising an open ended objective frame having a lens therein, an open ended eye-piece frame of less diameter than the objective frame and having a lens therein, and a plurality of spring strips pivoted at one end within the first named frame and pivoted at their other ends within the second named frame, said strips normally holding said frames in spaced relation, partial relative rotation of said frames resulting in twisting of said strips into spiral form with said second named frame disposed within said spiral and within said first named frame.

In testimony whereof I affix my signature.

EMIL NORMAN.